US011113608B2

(12) United States Patent
Salameh et al.

(10) Patent No.: US 11,113,608 B2
(45) Date of Patent: Sep. 7, 2021

(54) HYBRID BOT FRAMEWORK FOR ENTERPRISES

(71) Applicant: Accenture Global Solutions Limited, Dublin (IE)

(72) Inventors: Tariq Mohammad Salameh, Dubai (AE); Michele Tornielli, Dubai (AE)

(73) Assignee: Accenture Global Solutions Limited, Dublin (IE)

( * ) Notice: Subject to any disclaimer, the term of this patent is extended or adjusted under 35 U.S.C. 154(b) by 847 days.

(21) Appl. No.: 15/797,954

(22) Filed: Oct. 30, 2017

(65) Prior Publication Data
US 2019/0130286 A1    May 2, 2019

(51) Int. Cl.
G06N 5/02    (2006.01)
G06F 9/54    (2006.01)
G10L 15/30    (2013.01)

(52) U.S. Cl.
CPC .............. *G06N 5/022* (2013.01); *G06F 9/54* (2013.01); *G10L 15/30* (2013.01)

(58) Field of Classification Search
None
See application file for complete search history.

(56) References Cited

U.S. PATENT DOCUMENTS

| 8,706,503 | B2 | 4/2014 | Cheyer et al. |
| 9,275,641 | B1 | 3/2016 | Gelfenbeyn et al. |
| 9,484,030 | B1 | 11/2016 | Meaney et al. |
| 10,229,680 | B1 | 3/2019 | Gillespie |
| 10,528,228 | B2* | 1/2020 | Seixeiro .................. G06F 3/167 |
| 2010/0064229 | A1* | 3/2010 | Lau ....................... G06F 16/972 715/744 |
| 2011/0015928 | A1 | 1/2011 | Odell |

(Continued)

FOREIGN PATENT DOCUMENTS

| CN | 1299105 | 6/2001 |
| CN | 101553769 | 10/2009 |

(Continued)

OTHER PUBLICATIONS

Singapore Search Report for Application No. 10201806803T, dated Aug. 13, 2019, 3 pages.

(Continued)

*Primary Examiner* — Alan Chen
(74) *Attorney, Agent, or Firm* — Fish & Richardson P.C.

(57) ABSTRACT

Implementations are directed to receiving communication data from a device, the communication data including data input by a user of the device, determining a context based on an extended finite state machine that defines contexts and transitions between contexts, transmitting a service request to at least one cloud-hosted service, the service request being provided at least partially based on masking sensitive information included in the communication data, receiving a service response from the at least one cloud-hosted service, the service response including one or more of an intent, and an entity, determining at least one action that is to be performed by at least one back-end source system based on the service response, providing a response at least partially based on an action results received from the at least one back-end source system, and transmitting the result data to the device.

30 Claims, 4 Drawing Sheets

(56) References Cited

U.S. PATENT DOCUMENTS

| | | | |
|---|---|---|---|
| 2012/0016678 | A1 | 1/2012 | Gruber et al. |
| 2012/0278634 | A1 | 11/2012 | Luukkala et al. |
| 2014/0244712 | A1 | 8/2014 | Walters et al. |
| 2014/0316764 | A1 | 10/2014 | Ayan et al. |
| 2014/0351494 | A1 | 11/2014 | Barthe et al. |
| 2014/0365226 | A1 | 12/2014 | Sinha |
| 2015/0066479 | A1 | 3/2015 | Pasupalak et al. |
| 2015/0142704 | A1 | 5/2015 | London |
| 2015/0179170 | A1 | 6/2015 | Sarikaya et al. |
| 2016/0062983 | A1 | 3/2016 | Jung et al. |
| 2016/0173578 | A1 | 6/2016 | Sharma |
| 2016/0188565 | A1 | 6/2016 | Robichaud |
| 2016/0379107 | A1 | 12/2016 | Li et al. |
| 2016/0379638 | A1 | 12/2016 | Basye et al. |
| 2017/0004184 | A1 | 1/2017 | Jain et al. |
| 2017/0068550 | A1 | 3/2017 | Zeitlin |
| 2017/0083622 | A1 | 3/2017 | Blanco |
| 2017/0277560 | A1 | 9/2017 | Lucas et al. |
| 2017/0358303 | A1 | 12/2017 | Walker, II et al. |
| 2017/0359707 | A1* | 12/2017 | Diaconu ............... G10L 15/26 |
| 2018/0157959 | A1 | 6/2018 | Cai et al. |
| 2018/0253638 | A1 | 9/2018 | Maga et al. |
| 2018/0336903 | A1* | 11/2018 | Durham ............... G06F 40/35 |
| 2019/0332785 | A1* | 10/2019 | AthuluruTIrumala ..................... G06Q 10/06 |

FOREIGN PATENT DOCUMENTS

| | | |
|---|---|---|
| CN | 104615589 | 5/2015 |
| CN | 104838354 | 8/2015 |
| CN | 105027197 | 11/2015 |
| CN | 105094315 | 11/2015 |
| CN | 105637507 | 6/2016 |
| CN | 106407333 | 6/2016 |
| CN | 105794169 | 7/2016 |
| CN | 106462577 | 2/2017 |
| CN | 106776936 | 5/2017 |
| CN | 107003797 | 8/2017 |
| CN | 107111725 | 8/2017 |
| EP | 3122001 | 1/2017 |
| WO | WO 2013/155619 | 10/2013 |
| WO | WO 2016/042814 | 3/2016 |

OTHER PUBLICATIONS

Celikyilmaz et al., Abstract "Convolutional Neural Network Based Semantic Tagging with Entity Embeddings," Presented at NIPS Workshop on Machine Learning for SLU & Interaction, Montreal, Canada, Dec. 11, 2015 [retrieved on Jul. 9, 2018], retrieved from URL:https://www.microsoft.com/en-us/research/publication/convoluational-neural-network-based-semantic-tagging-with-entity-embeddings, 6 pages.

Collobert et al., "Natural language processing (almost) from scratch," JMLR, Aug. 2011, 12:2493-2537, 45 pages.

Dos Santos et al., "Boosting Named Entity Recognition with Neural Character Embeddings," Abstract, ARXIV.org, XP080802663, Cornell University Library, May 19, 2015, 7 pages.

European Preliminary Report on Patentability in European Application No. 18154752, dated Jul. 9, 2018, 125 pages.

Hashemi et al., Abstract "Query Intent Detection using Convolutional Neural Networks," Presented at ACM International Conference on Web Search and Data Mining; Workshop on Query Understanding for Search on All Devices, San Francisco, CA, Feb. 22, 2016, [retrieved on Jul. 9, 2018], retrieved from URL:http//people.cs.pitt.edu/~hashemi/papers/QRUMS2016_HBHashemi.pdf, 5 pages.

Hauswald et al., "Abstract DjiNN and tonic," Presented at Proceedings of the $42^{nd}$ International Symposium on Computer Architecture, ISCA '15, New York, NY Jun. 17, 2015, 14 pages.

Natural Language Dialog Systems and Intelligent Assistants, Springer (ed) 2015, Chapter 1, Willams et al., Rapidly Scaling Dialog Systems with Interactive Learning, 13 pages.

Singapore Preliminary Report on Patentability in Singapore Application No. 10201800824P, dated Jul. 31, 2018, 8 pages.

Garfield et al., "Call Classification using Recurrent Neural Networks, Support Vector Machines and Finite State Automata," Dated Jan. 29, 2004, 24 pages.

Sarikaya et al., "Application of Deep Belief Networks for Natural Language Understanding," IEEE Transactions on Audio, Speech and Language Processing, Dated Apr. 2014, 7 pages.

SG Written Opinion in Singaporean Application No. 10201800824P, dated Nov. 21, 2019, 4 pages.

Australian Examination Report for Application No. 2018201387, dated Sep. 27, 2018, 12 pages.

Kim, "Convolutional neural networks for sentence classification," arXiv preprint Sep. 3, 2014, [retrieved on Nov. 9, 2018] retrieved from https://arxiv.org/pdf/1408.5882.pdf, 6 pages.

Singapore Search Report for Application No. 10201800824P, dated Apr. 23, 2018, 3 pages.

Australian Examination Report for Application No. 2018241117, dated Mar. 22, 2019, 6 pages.

Australian Examination Report for Application No. 2018201387, dated Apr. 23, 2018, 6 pages.

European Search Report for Application No. 18192159.4, dated Mar. 14, 2019, 12 pages.

Singapore Search Report for Application No. 10201800824P, dated Mar. 25, 2019, 4 pages.

CN Office Action in Chinese Appln. No. 201811237221.1, dated Jan. 18, 2021, 21 pages (with English translation).

CN Office Action in Chinese Appln. No. 201810166849.4, dated Jun. 30, 2021, 13 pages (with Machine English Translation).

CN Office Action in Chinese Appln. No. 201811237221.1, dated Jul. 6, 2021, 8 pages (with Machine English Translation).

Davis et al., "Privacy Preservation in the Age of Big Data: A Survey," RAND Corporation, Sep. 2016, WR-1161, 17 pages.

EP Office Action in European Appln. No. 18192159.4, dated Jul. 9, 2021, 13 pages.

Suzie et al., "Towards Secure Collaboration in Federated Cloud Enviroments," 2016 11th International Conference on Availability, Reliability and Security, Salzburg, Austria, Aug. 31-Sep. 2, 2016, 750-759.

Yao et al., "Distributed Clustering Algorithm Based on Privacy Protection," Computer Science, Mar. 2009, 36(3):100-102, 105 (with English Abstract).

* cited by examiner

HYBRID BOT FRAMEWORK FOR ENTERPRISES

BACKGROUND

Enterprises increasingly provide automated services to users. Example automated services can include artificial intelligence that processes the user input to perform actions (e.g., route calls, provide information). Integration of such automated services into an enterprise can be problematic. For example, on-premise solutions (e.g., applications installed on, and executed using hardware operated by an enterprise) are time, cost, and computing resource intensive (e.g., significant computing resources need be established to provide the on-premise solution). Cloud-based solutions provide their own set of problems including, for example, maintaining security and confidentiality of information (e.g., personally identifiable information (PII)).

SUMMARY

Implementations of the present disclosure are generally directed to a computer-implemented, bot framework for enterprises. More particularly, implementations of the present disclosure are directed to a hybrid platform that provides on-premise components, and leverages cloud-hosted components.

In some implementations, actions include receiving communication data from a device, the communication data including data input by a user of the device, determining a context based on an extended finite state machine that defines contexts and transitions between contexts, transmitting a service request to at least one cloud-hosted service, the service request being provided at least partially based on masking sensitive information included in the communication data, receiving a service response from the at least one cloud-hosted service, the service response including one or more of an intent, and an entity, determining at least one action that is to be performed by at least one back-end source system based on the service response, providing a response at least partially based on an action results received from the at least one back-end source system, and transmitting the result data to the device. Other implementations of this aspect include corresponding systems, apparatus, and computer programs, configured to perform the actions of the methods, encoded on computer storage devices.

These and other implementations can each optionally include one or more of the following features: the at least one action is determined by identifying a transition from the context using the extended finite state machine based on one or more of the intent and the entity, the transition indicating the at least one action; actions further include determining that a data set to be transmitted in the service request includes the sensitive information, and in response, removing the sensitive information from the data set using an on-premise masking component prior to transmitting the service request to the at least one cloud-hosted service; determining the context includes querying an on-premise session manager for a current context, the context being returned in response to the query; the communication data is received from the device through a channel connector corresponding to a plurality of channels, through which communication data can be received; actions further include transforming a format of the communication data to a standard format using an on-premise data unification layer; the hybrid framework includes an on-premise portion that selectively transmits requests to, and receives responses from a plurality of cloud-hosted services; the at least one cloud-hosted service includes one or more of a natural language processing (NLP) service, a sentiment analysis service, a speech-to-text service, and a translation service; the at least one cloud-hosted service is configured to determine one or more of the intent, and the entity; and the extended finite state machine is configurable by a user based on one or more requirements.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to a computer-implemented platform for an artificial intelligence (AI)-based digital agent (also referred to herein as a bot framework, and/or AI assistant). More particularly, implementations of the present disclosure are directed to a hybrid platform that provides on-premise components, and leverages cloud-hosted components. In general, and as described in further detail herein, the multilingual bot framework of the present disclosure eases the burden of enterprise integration of bot solutions, enables interactions through multiple channels, and leverages cloud-hosted components to perform services, while maintaining security and confidentiality of information (e.g., personally identifiable information (PII)).

As described in further detail herein, implementations of the present disclosure include actions of receiving communication data from a device, the communication data including data input by a user of the device, determining a context based on an extended finite state machine that defines contexts and transitions between contexts, transmitting a service request to at least one cloud-hosted service, the service request being provided at least partially based on masking sensitive information included in the communication data, receiving a service response from the at least one cloud-hosted service, the service response including one or more of an intent, and an entity, determining at least one action that is to be performed by at least one back-end source system based on the service response, providing a response at least partially based on an action results received from the at least one back-end source system, and transmitting the result data to the device.

Figure 1:
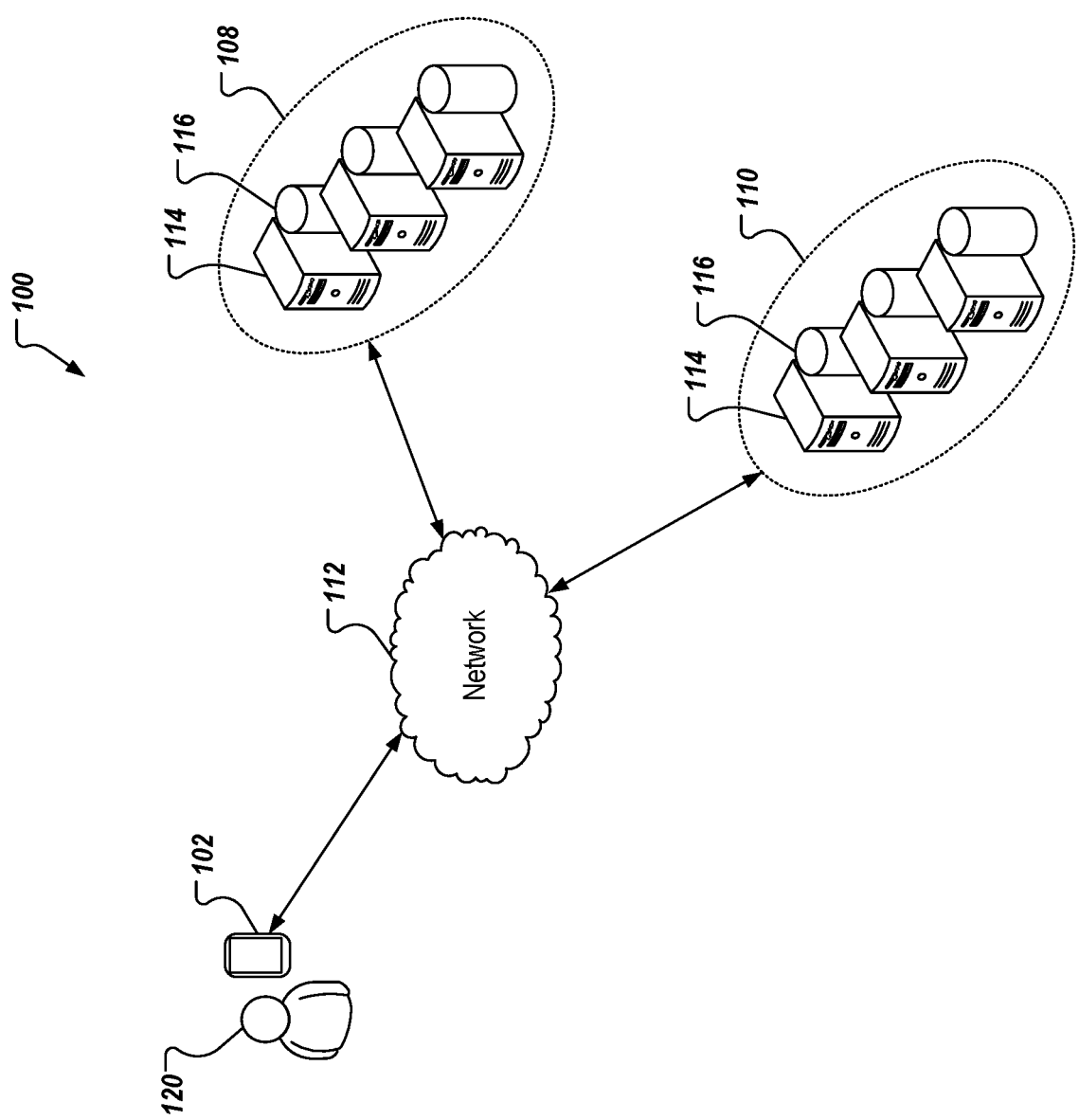
FIG. 1 depicts an example high-level architecture in accordance with implementations of the present disclosure.

FIG. 1 depicts an example high-level architecture 100 in accordance with implementations of the present disclosure. The example architecture 100 includes a device 102, back-end systems 108, 110, and a network 112. In some examples, the network 112 includes a local area network (LAN), wide area network (WAN), the Internet, a cellular telephone network, a public switched telephone network (PSTN), a private branch exchange (PBX), or any appropriate combination thereof, and connects web sites, devices (e.g., the device 102), and back-end systems (e.g., the back-end systems 108, 110). In some examples, the network 112 can be accessed over a wired and/or a wireless communications link. For example, mobile devices, such as smartphones can utilize a cellular network to access the network 112.

In the depicted example, each of the back-end systems 108, 110 includes at least one server system 114, and data store 116 (e.g., database). In some examples, one or more of the back-end systems hosts one or more computer-implemented services that users can interact with using devices. For example, and as described in further detail herein, the back-end systems 108, 110 can host the hybrid bot framework in accordance with implementations of the present disclosure. In some examples, the device 102 can each include any appropriate type of computing device such as a desktop computer, a laptop computer, a handheld computer, a tablet computer, a personal digital assistant (PDA), a cellular telephone, a network appliance, a camera, a smartphone, a telephone, a mobile phone, an enhanced general packet radio service (EGPRS) mobile phone, a media player, a navigation device, an email device, a game console, or an appropriate combination of any two or more of these devices, or other data processing devices.

In the depicted example, the device 102 is used by a user 120. In accordance with the present disclosure, the user 120 uses the device 102 to interact with the bot framework of the present disclosure. In some examples, the user 120 can include a customer of an enterprise that provides the hybrid bot framework. For example, the user 120 can include a customer that communicates with the enterprise through one or more channels using the device 102. In accordance with implementations of the present disclosure, and as described in further detail herein, the user 120 can provide verbal input (e.g., speech), textual input, and/or visual input (e.g., images, video) to the hybrid bot platform, which can process the input to perform one or more actions, and/or provide one or more responses.

Implementations of the present disclosure are described in further detail herein with reference to an example context. The example context includes an air travel provider (e.g., airline) as an enterprise that implements the hybrid bot framework of the present disclosure. In the example context a user (e.g., a passenger) can interact with the hybrid bot framework to perform tasks related to flights (e.g., book a flight, check flight status). It is contemplated, however, that implementations of the present disclosure can be realized in any appropriate context. As used herein, the term "bot" can refer to an AI assistant in accordance with implementations of the present disclosure.

Figure 2:
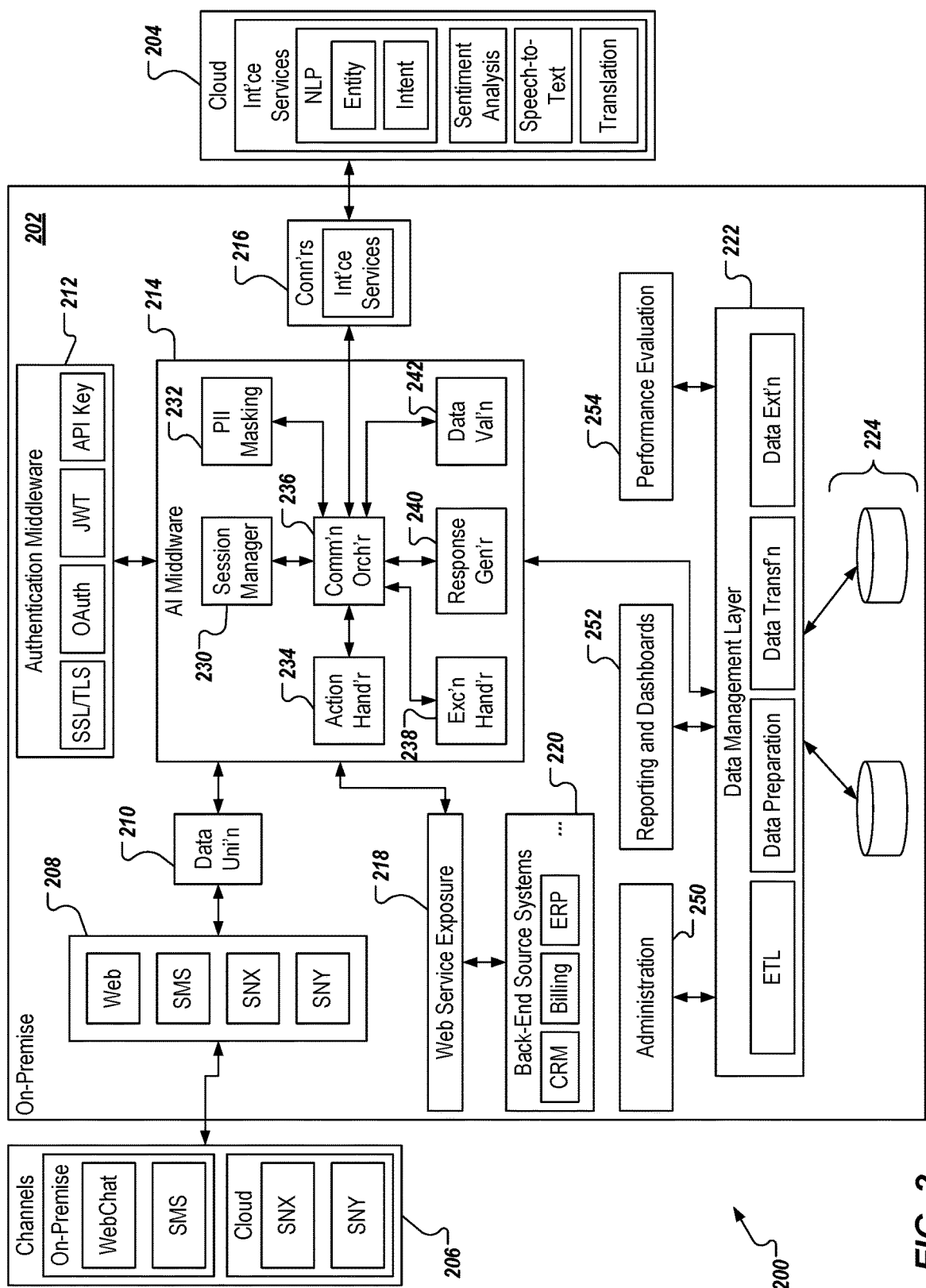
FIG. 2 depicts an example architecture in accordance with implementations of the present disclosure.

FIG. 2 depicts an example architecture 200 of a hybrid bot framework in accordance with implementations of the present disclosure. In some examples, components of the example architecture 200 can be hosted on one or more back-end systems (e.g., the back-end systems 108, 110 of FIG. 1). In some examples, each component of the example architecture 200 is provided as one or more computer-executable programs executed by one or more computing devices.

In the depicted example, the example architecture 200 includes an on-premise portion 202, and a cloud portion 204 (e.g., of an AI assistant of the present disclosure). In some examples, the on-premise portion 202 is hosted on a back-end system of an enterprise providing the bot framework (e.g., an airline). That is, within an intranet of the enterprise, for example. For example, the on-premise portion 202 can be hosted on the back-end system 108 of FIG. 1. In some examples, the cloud portion 204 is hosted on one or more back-end systems of respective cloud-based service providers. For example, at least a portion of the cloud portion 204 can be hosted on the back-end system 110 of FIG. 1.

In the depicted example, the example architecture 200 includes channels 204, through which a user (e.g., a passenger) can communicate with the on-premise portion 202. Example channels include voice, chat, text (e.g., short messaging service (SMS)), social networks, and the like. For example, the user can use a device (e.g., the device 102 of FIG. 1) to send a SMS text to the on-premise portion 204 (e.g., over the network 112 of FIG. 1). As another example, the user can provide input through one or more social networks (e.g., a first social network (SNX), a second social network (SNY)) to the on-premise portion 204 (e.g., over the network 112 of FIG. 1). As another example, the user can provide input through an instant messaging application (e.g., chat).

In some implementations, the on-premise portion 202 includes channel connectors 208, a data unification layer 210, authentication middleware 212, artificial intelligence (AI) middleware 214, connectors 216, a web service exposure 218, back-end source systems 220, a data management layer 222, and one or more databases 224. In general, and as described in further detail herein, user communications are received through one or more of the connectors 208, and are provided to the AI middleware 214 through the data unification layer 210. A user providing a communication is authenticated by the authentication middleware 212, and, if authenticated, a session is established between the user's device (e.g., the device 102 of FIG. 1), and the AI middleware 214. Authentication can be executed in any appropriate manner (e.g., credentials (username/password), tokens). During the session, the AI middleware 214 can leverage cloud-hosted intelligence services provided by the cloud portion 204 through the connectors 216.

In some examples, the data unification layer 210, included in the on-premise portion 202, converts a format of an incoming message into a standard format that can be processed by components of the on-premise portion 202. For example, the message can be received in a channel-specific format (e.g., if received through WebChat, a first format; if received through a social network, a second format), and the data unification layer 210 converts the message to the standard format (e.g., text). In some examples, the data unification layer 210 converts an outgoing message from the standard format to a channel-specific format. In some examples, the channel connectors 208 abstract details of integrating with the various channels 206 of user communication from the remainder of the on-premise portion 202. This includes communication details as well as the abstraction of data representations. In some examples, the connectors 216 abstract the details of integrating with the cloud-hosted services from the remainder of the AI assistant. This includes communication details, and data representations.

In some implementations, the AI middleware 214 includes a session manager 230, a PII masking component 232, an action handler 234, a communications orchestrator 236, an exception handler 238, a response generator 240, and one or more data validation modules 242. The session manager 230 maintain the state, and context of the interactions between the user, and the AI assistant. In some examples, a new session is instantiated each time a user initiates communication with the AI assistant, and the context is maintained throughout based on mapped intents, described in further detail herein. In this manner, the AI Assistant is able to provide context-relevant response.

In some examples, the PII masking component 232 masks data that is determined to be PII. In this manner, PII is not communicated to cloud-hosted services (e.g., is not exposed over the public Internet). In some examples, masking includes removing data (PII) from a data set that is to be communicated to a cloud-hosted service. In some examples, the occurrence of PII can be determined based on rules, and/or regular expressions (regex). In some examples, masking can include character substitution, word substitution, shuffling, number/date variance, encryption, truncation, character masking, and/or partial masking.

It can be determined that information from a cloud-hosted service is required (e.g., an intent/entity of a message received from the user needs to be determined). Consequently, a message including a data set to-be-processed by the cloud-hosted service can be constructed. Any entity within the data set that is determined to be PII can be removed from the data set. For example, an entity that includes PII is not needed to receive an accurate response from one or more of the cloud-hosted services (e.g., the user's account number is not needed for the cloud-hosted service to determine an intent of the message).

In some examples, the action handler 234 coordinates the execution of one or more actions. For example, the action handler 234 sends a request to one or more of the back-end source systems to fulfill an action. Example actions can include, without limitation, retrieving stored information, recording information, executing calculations, and the like. For example, it can be determined that an action that is to be performed includes looking up the status of a particular flight (e.g., as described in further detail herein). To execute this action, the action handler 234 can transmit a request that includes the flight number, can transmit the request to a back-end source system (e.g., a flight scheduling system that records the statuses of flights), and can receive a response from the back-end source system, which includes the result of the action (e.g., a string value indicating the status of the flight assigned to the flight number). Additional detail on an action handler is described in further detail in commonly assigned U.S. application Ser. No. 15/616,007, filed on Jun. 7, 2017, the disclosure of which is expressly incorporated herein by reference.

In some examples, the communication orchestrator 236 orchestrates communication between components both internal to the AI middleware 214, and external to the AI middleware 214. For example, the communication orchestrator 236 receives communications from the data unification layer 210 (e.g., requests provided from the user device), and provides communications to the data unification layer 210 (e.g., response to the user device). As another example, the communication orchestrator 236 communicates with the data management layer 222 to access the databases 224. As another example, the communication orchestrator 236 communicates with the cloud-hosted services through the connectors 216 (e.g., sends requests to, receives responses from). In some examples, when a message is received, the communications orchestrator 236 initially provides message information to the one or more data validation modules 242 to determine whether data provided in the message is in an expected format, as described herein.

In some examples, the exception handler 238 processes any exceptions (e.g., errors) that may occur during the data. Example exceptions can include, without limitation, cloud-hosted services are not accessible, back-end system is not responding, runtime exceptions (such as null pointer exception). In some examples, the response generator 240 constructs response messages to transmit back to the user. In some examples, the response message can include a result of an action, and one or more entities. Continuing with examples provided herein, an example response message can include "Flight No. 123 is on-time" (e.g., a response to a user request for the status of the entity "flight number 123"). In some examples, the response message can include a request for clarification, and/or corrected information. Continuing with examples provided herein, an example response message can include "ABC123 is an invalid format. Please provide your frequent flyer number in a 6-digit numerical format (######)."

In some examples, the one or more data validation modules 242 validate information provided from the user through the channel(s). In some examples, a validation module 242 determines whether the information received is in an expected format. For example, the AI assistant may request an account number assigned to the user (e.g., a chat message stating "Please provide your frequent flyer number."). A response message from the user is processed by the data validation module 242 to determine whether the response message includes the account number in the expected format (e.g., 6-digit number). For example, if the response message includes "ABC123," the data validation module 242 can determine that the account number is not in the improper format. In such a case, a message can be provided back to the user indicating that the account number does not conform to the expected format (e.g., "ABC123 is an invalid format. Please provide your frequent flyer number in a 6-digit numerical format (######)."). As another example, if the response message includes "123456," the data validation module 242 can determine that the account number is in the improper format. In such a case, the AI assistant can progress through the conversation (e.g., transition between contexts, as described in further detail herein).

In some implementations, the data validation module 242 determines whether a request is to be sent to one or more of the cloud-hosted services. Continuing with the above example, if the response message includes "123456," the data validation module 242 can determine that the account number is in the improper format, and that there is no need to retrieve an intent or an entity from the cloud-hosted services.

In some implementations, components of the AI middleware 214 can be referred to as a conversation manager. Example components of the conversation manager can include the session manager 230, and the PII masking component 232 of the AI middleware 214 of FIG. 2. Other components of the conversation manager can include a conversation logger, a domain integration component, and a conversation rule-base (not depicted in FIG. 2). In some examples, the conversation logger records all communications between the user and the AI assistant. In some examples, details of logged conversations can be used by the enterprise to monitor the effectiveness of the AI assistant in providing the intended user experience. In some examples, the domain integration component abstracts the details of integration with the back-end source systems 220 from the remainder of the AI assistant components. This includes abstraction of communication details, and data representations. In some examples, the conversation rules support an extended finite state machine approach to manage conversations with users, and to transition between different contexts based on multiple factors (e.g., intent, entities, actions). For example, responses to users are functions of context, intent, entities, and actions. An example extended finite state machine is described in detail herein with reference to FIG. 3.

In some implementations, the cloud portion 204 includes one or more cloud-hosted services. Example cloud-hosted services include, without limitation, natural language processing (NLP) (e.g., entity extraction, intent extraction), sentiment analysis, speech-to-text, and translation. An example speech-to-text service includes Google Cloud Speech provided by Google, Inc. of Mountain View, Calif. In some examples, Google Cloud Speech converts audio data to text data by processing the audio data through neural network models. An example NLP service includes TensorFlow provided by Google, Inc. of Mountain View, Calif. In some examples, TensorFlow can be described as an open source software library for numerical computation using data flow graphs. Although example cloud-hosted services are referenced herein, implementations of the present disclosure can be realized using any appropriate cloud-hosted service.

In some implementations, the AI middleware 214 communicates with one or more of the back-end source systems 220 through the web service exposure 218. Example back-end source systems include, without limitation, a customer relationship management (CRM) system, a billing system, and an enterprise resource planning (ERP) systems. In some implementations, the AI middleware 214 communicates with the data management layer 222 to access the databases 224. In the depicted example, the data management layer 222 includes an (ETL) component, a data preparation component, a data transformation component, and a data extraction component.

The on-premise portion 202 also includes an administration component 250, a reporting and dashboards component 252, and a performance evaluation component 254.

In some implementations, the administration component 250 includes an intelligence service selector, an AI training component, and an AI model management component. In some examples, the intelligence service selector enables an administrator to select the cloud-hosted services to be used by the AI assistant (e.g., for NLP, sentiment analysis, translation). For example, selection may be the same for all capabilities, or the administrator may choose to select different cloud-hosted services for different capabilities (e.g., Cortana for NLP, Google ML for sentiment analysis). In some examples, the AI training component runs bulk training data against AI models of cloud-hosted services (e.g., AI model used for sentiment analysis), thereby allowing the administrator access to API features of the cloud-hosted service from a familiar front end. In some examples, the AI management component enables the administrator to maintain the intents and entities that are required to be processed by the cloud-hosted services, thereby allowing the administrator access to API features of the cloud-hosted service from a familiar front end.

In some implementations, the reporting and dashboards component 252 includes an audit log manager, an audit log repository, a reporting dashboard, and a conversation log repository. In some examples, the audit log manager enables the administrator to view all logs generated by the various AI assistant components (e.g., for operations monitoring and maintenance). In some examples, log messages are stored in the audit log repository. In some examples, the reporting dashboard enables the administrator administrators to view all conversations that took place between the users and the AI assistant, and can indicate, for example, conversations that were completed successfully, and conversations that were abandoned.

In some implementations, the performance evaluation component 254 includes an AI accuracy reporting component, an AI testing facility, and an AI model log repository. In some examples, the AI accuracy reporting component measures the overall accuracy of the cloud-hosted services (e.g., based on deriving trained intents from inputs provided). In some examples, accuracy reports rely on the AI model log repository, in which each request and response made to the cloud-hosted services is logged. In some examples, the AI testing facility enables the administrator to interact directly with AI models of the cloud-hosted services to test respective performances of the AI model (e.g., in deriving the correct intent based on the user input).

Figure 3:
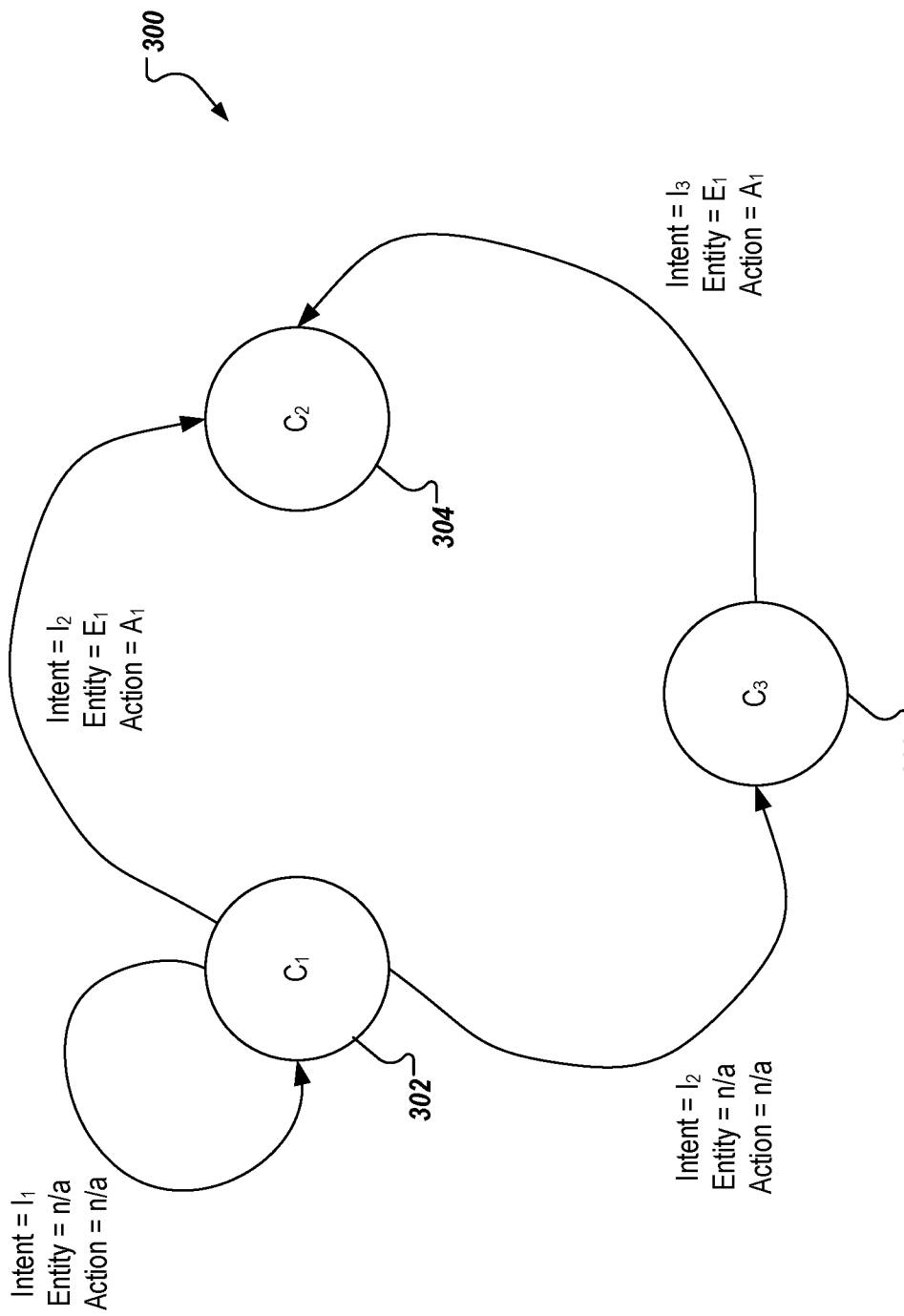
FIG. 3 depicts an example extended finite state-machine in accordance with implementations of the present disclosure.

FIG. 3 depicts an example extended finite state machine 300 in accordance with implementations of the present disclosure. The example extended finite state machine 300 of FIG. 3 is simplified for the purposes of description herein. The example extended finite state machine 300 includes states 302, 304, 306, which represent respective contexts $C_1$, $C_2$, $C_3$. In the depicted example, the state 302 can represent an initial context (e.g., an initial state when a user communicates with the AI assistant). In the example context of an airline, the context $C_1$ can correspond to a welcome context. In the welcome context, an example response provided by the AI assistant can include "How can I help you?"

Transitions can occur between the states 302, 304, 306 based on one or more factors. Example factors include intent(s), entit(y/ies), and action(s). For example, in FIG. 2, if a first intent $I_1$ is provided, and is not associated with any entity or action, the state remains at the state 302. As another example, in FIG. 2, if a second intent $I_2$, a first entity $E_1$, and a first action $A_1$ are provided, the state transitions from the state 302 to the state 304. As another example, in FIG. 2, if the second intent $I_2$ is provided, and is not associated with any entity or action, the state transitions from the state 302 to the state 306. As another example, in FIG. 2, if a third intent $I_3$, the first entity $E_1$, and the first action $A_1$ are provided, the state transitions from the state 306 to the state 304.

In the example context, the following can be provided: $C_1$=WelcomeContext, $C_2$=PerformFlightTracking, $C_3$=FlightTracking; $I_1$=Greeting, $I_2$=FlightStatus, $I_3$=ProvideIn- formation; $E_1$=FlightNumber; $A_1$=CallFlightTrackingWebService.

Using the above example values, and in the example context, a user can communicate with the AI assistant to request the status of a particular flight. For example, the user interacts with the AI assistant through a chat channel (e.g., instant messaging), providing the input "Hi." In response, the initial state, the state 302, can be established with the intent Greeting. For example, the user input "Hi" can be processed by a cloud-hosted NLP service to return the intent "Greeting." Consequently, the AI assistant can respond with "Hi. How can I help you today?" The user can input "My name is Joe Flyalot, and I would like to know the status of flight number 123."

In this example, the user input can be processed by the AI assistant, and it can be determined that the user input includes PII, the name "Joe Flyalot." Consequently, the PII masking component can remove the PII, and transmit the remaining user input to the cloud-hosted services. A response from the cloud-hosted services can include the intent FlightStatus, and the entity FlightNumber. The action handler can process the response to determine the action CallFlightTrackingWebService. Consequently, the state can transition from the state 302 to the state 304.

Continuing with this example, the AI assistant can make a call to (e.g., send a request to) a flight tracking service (e.g., a back-end source system), the request including the flight number (e.g., flight number 123). The AI assistant can receive a response from the flight tracking service (e.g., Status=on-time (or, delayed, or cancelled)), and can provide a corresponding response to the user. For example, "Thank you for your query Mr. Flyalot. Flight No. 123 is on-time."

Figure 4:
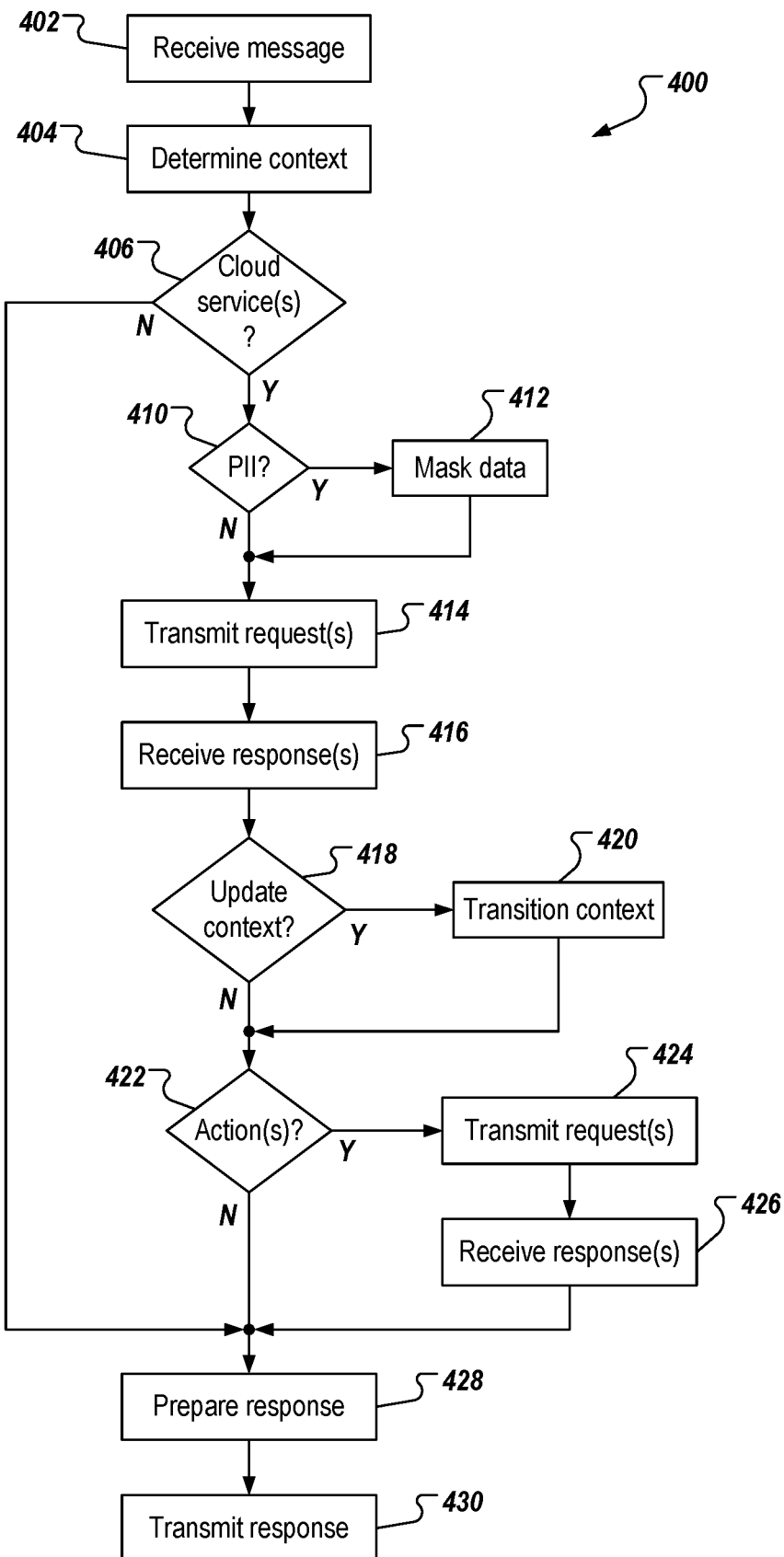
FIG. 4 depicts an example process that can be executed in accordance with implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 108 of FIG. 1).

A message is received (402). For example, the communication orchestrator 236 of FIG. 2 receives a message from the data unification layer 210. In some examples, and as described herein, a message can originate from a user device, and be transmitted to the on-premise portion 202 through a channel of the one or more channels 206, and the data unification layer 210 can transform the received format to a standardized format. A current context is determined (404). In some examples, the communication orchestrator 230 queries the session manager 230 to determine the current context. For example, and as described herein, the session manager 230 can maintain, or otherwise access an extended finite state machine, and the current state (context) of the extended finite state machine (e.g., the extended finite state machine 300 of FIG. 3). If the message is the first message received (e.g., after authentication of the user), the current context can include an initial context (e.g., Greeting, as described herein with reference to FIG. 3).

It is determined whether one or more cloud-hosted services are to be queried (406). For example, it can be determined that a cloud-hosted service is to be queried based on the current context (e.g., an entity, intent, and/or action needs to be determined to transition the context). If it is determined that a cloud-hosted service is to be queried, it is determined whether data to be sent to the one or more cloud-hosted services includes sensitive information (PII) (410). For example, it can be determined whether a data set that is to be transmitted to the cloud-hosted service includes PII (e.g., the user's name, account number, birthdate, etc.). If the data includes sensitive information, the sensitive data is masked (412). For example, the PII masking module 232 removes any sensitive information from the data set.

One or more requests are transmitted to the cloud-hosted service provider(s) (414), and respective responses are received (416). For example, the communication orchestrator 230 transmits requests through respective the connectors 216, and receives responses from the cloud-hosted services through the respective connectors 216. An example request can include determining one or more intents, and/or one or more entities included in the data. The cloud-hosted service(s) process the data in view of the request to provide a response data set (e.g., a set of intents, and/or entities determined from the request data).

It is determined whether the context is to be updated (418). For example, it can be determined whether the response data set(s) from the cloud-hosted service(s) includes intents, and/or entities that correspond to a transition in the extended finite state machine. As one example, if the response data set includes the intent FlightStatus, and the entity FlightNumber, and, consequently, the state can transition (e.g., from the state 302 to the state 304, as described above with reference to FIG. 3). The context is transitioned (420).

It is determined whether one or more actions are to be performed (422). For example, in view of the transition, a corresponding action can be determined. Continuing with the example above, it can be determined that the transition includes performing the action CallFlightTrackingWebService. If an action is to be performed, a request is transmitted to a respective back-end source service (424). For example, the action handler 234 transmits an action request to the respective back-end system, and a respective response is received (426). An example response can include the status of a flight number identified in the request.

A response is prepared (428), and the response is transmitted (430). For example, the response generator 240 prepares a response to the user's message, and the response is transmitted to the user device through the data unification layer 210, and the appropriate channel connector 208. Continuing with examples herein, an example response can include "Thank you for your query Mr. Flyalot. Flight No. 123 is on-time," to the example user message "What is the status of flight 123?"

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for managing interactions with an artificial intelligence (AI) assistant on a hybrid framework, the method being executed by one or more processors and comprising:

receiving communication data from a device, the communication data comprising data input by a user of the device;

determining a context based on an extended finite state machine that defines contexts and transitions between contexts, each state of the extended finite state machine comprising a context, transitions in a set of transitions between states comprising tuples of intent, entity, and action, a first transition comprising a first tuple comprising a first populated intent, a first populated entity, and a first populated action, and a second transition comprising a second tuple comprising a second populated intent, an unpopulated entity, and an unpopulated action;
transmitting a service request to at least one cloud-hosted service, the service request being provided at least partially based on masking sensitive information included in the communication data;
receiving a service response from the at least one cloud-hosted service, the service response comprising one or more of an intent, and an entity;
determining at least one action that is to be performed by at least one back-end source system based on the service response;
providing a user response at least partially based on an action results received from the at least one back-end source system; and
transmitting the user response to the device.

2. The method of claim 1, wherein the at least one action is determined by identifying a transition from the context using the extended finite state machine based on one or more of the intent and the entity, the transition indicating the at least one action.

3. The method of claim 1, further comprising determining that a data set to be transmitted in the service request comprises the sensitive information, and in response, removing the sensitive information from the data set using an on-premise masking component prior to transmitting the service request to the at least one cloud-hosted service.

4. The method of claim 1, wherein determining the context comprises querying an on-premise session manager for a current context, the context being returned in response to the query.

5. The method of claim 1, wherein the communication data is received from the device through a channel connector corresponding to a plurality of channels, through which communication data can be received.

6. The method of claim 1, further comprising transforming a format of the communication data to a standard format using an on-premise data unification layer.

7. The method of claim 1, wherein the hybrid framework comprises an on-premise portion that selectively transmits requests to, and receives responses from a plurality of cloud-hosted services.

8. The method of claim 1, wherein the at least one cloud-hosted service comprises one or more of a natural language processing (NLP) service, a sentiment analysis service, a speech-to-text service, and a translation service.

9. The method of claim 1, wherein the at least one cloud-hosted service is configured to determine one or more of the intent, and the entity.

10. The method of claim 1, wherein the extended finite state machine is configurable by a user based on one or more requirements.

11. One or more non-transitory computer-readable storage media coupled to one or more processors and having instructions stored thereon which, when executed by the one or more processors, cause the one or more processors to perform operations for managing interactions with an artificial intelligence (AI) assistant on a hybrid framework, the operations comprising:
receiving communication data from a device, the communication data comprising data input by a user of the device;
determining a context based on an extended finite state machine that defines contexts and transitions between contexts, each state of the extended finite state machine comprising a context, transitions in a set of transitions between states comprising tuples of intent, entity, and action, a first transition comprising a first tuple comprising a first populated intent, a first populated entity, and a first populated action, and a second transition comprising a second tuple comprising a second populated intent, an unpopulated entity, and an unpopulated action;
transmitting a service request to at least one cloud-hosted service, the service request being provided at least partially based on masking sensitive information included in the communication data;
receiving a service response from the at least one cloud-hosted service, the service response comprising one or more of an intent, and an entity;
determining at least one action that is to be performed by at least one back-end source system based on the service response;
providing a user response at least partially based on an action results received from the at least one back-end source system; and
transmitting the user response to the device.

12. The computer-readable storage media of claim 11, wherein the at least one action is determined by identifying a transition from the context using the extended finite state machine based on one or more of the intent and the entity, the transition indicating the at least one action.

13. The computer-readable storage media of claim 11, wherein operations further comprise determining that a data set to be transmitted in the service request comprises the sensitive information, and in response, removing the sensitive information from the data set using an on-premise masking component prior to transmitting the service request to the at least one cloud-hosted service.

14. The computer-readable storage media of claim 11, wherein determining the context comprises querying an on-premise session manager for a current context, the context being returned in response to the query.

15. The computer-readable storage media of claim 11, wherein the communication data is received from the device through a channel connector corresponding to a plurality of channels, through which communication data can be received.

16. The computer-readable storage media of claim 11, wherein operations further comprise transforming a format of the communication data to a standard format using an on-premise data unification layer.

17. The computer-readable storage media of claim 11, wherein the hybrid framework comprises an on-premise portion that selectively transmits requests to, and receives responses from a plurality of cloud-hosted services.

18. The computer-readable storage media of claim 11, wherein the at least one cloud-hosted service comprises one or more of a natural language processing (NLP) service, a sentiment analysis service, a speech-to-text service, and a translation service.

19. The computer-readable storage media of claim 11, wherein the at least one cloud-hosted service is configured to determine one or more of the intent, and the entity.

20. The computer-readable storage media of claim 11, wherein the extended finite state machine is configurable by a user based on one or more requirements.

21. A system, comprising:
one or more processors; and
a computer-readable storage device coupled to the one or more processors and having instructions stored thereon which, when executed by the one or more processors, cause the one or more processors to perform operations for managing interactions with an artificial intelligence (AI) assistant on a hybrid framework, the operations comprising:

receiving communication data from a device, the communication data comprising data input by a user of the device;

determining a context based on an extended finite state machine that defines contexts and transitions between contexts, each state of the extended finite state machine comprising a context, transitions in a set of transitions between states comprising tuples of intent, entity, and action, a first transition comprising a first tuple comprising a first populated intent, a first populated entity, and a first populated action, and a second transition comprising a second tuple comprising a second populated intent, an unpopulated entity, and an unpopulated action;

transmitting a service request to at least one cloud-hosted service, the service request being provided at least partially based on masking sensitive information included in the communication data;

receiving a service response from the at least one cloud-hosted service, the service response comprising one or more of an intent, and an entity;

determining at least one action that is to be performed by at least one back-end source system based on the service response;

providing a user response at least partially based on an action results received from the at least one back-end source system; and transmitting the user response to the device.

22. The system of claim 21, wherein the at least one action is determined by identifying a transition from the context using the extended finite state machine based on one or more of the intent and the entity, the transition indicating the at least one action.

23. The system of claim 21, wherein operations further comprise determining that a data set to be transmitted in the service request comprises the sensitive information, and in response, removing the sensitive information from the data set using an on-premise masking component prior to transmitting the service request to the at least one cloud-hosted service.

24. The system of claim 21, wherein determining the context comprises querying an on-premise session manager for a current context, the context being returned in response to the query.

25. The system of claim 21, wherein the communication data is received from the device through a channel connector corresponding to a plurality of channels, through which communication data can be received.

26. The system of claim 21, wherein operations further comprise transforming a format of the communication data to a standard format using an on-premise data unification layer.

27. The system of claim 21, wherein the hybrid framework comprises an on-premise portion that selectively transmits requests to, and receives responses from a plurality of cloud-hosted services.

28. The system of claim 21, wherein the at least one cloud-hosted service comprises one or more of a natural language processing (NLP) service, a sentiment analysis service, a speech-to-text service, and a translation service.

29. The system of claim 21, wherein the at least one cloud-hosted service is configured to determine one or more of the intent, and the entity.

30. The system of claim 21, wherein the extended finite state machine is configurable by a user based on one or more requirements.

* * * * *